Figure 1:
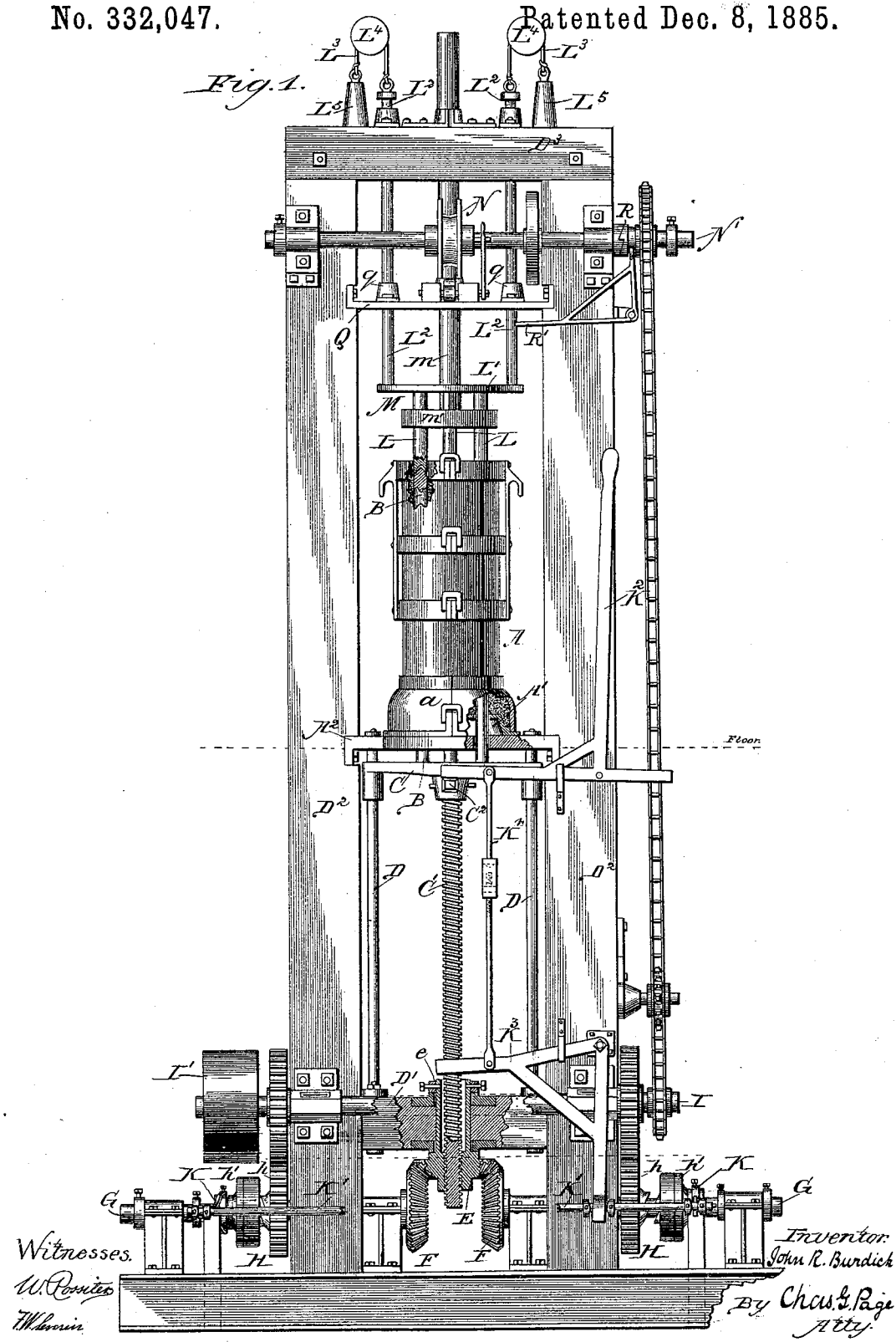

(No Model.) 3 Sheets—Sheet 1.

J. R. BURDICK.
APPARATUS FOR MOLDING THE SECTIONS OF CONDUITS FOR UNDERGROUND CONDUCTORS.

No. 332,047. Patented Dec. 8, 1885.

Witnesses.
W. Rossiter
F. W. Lewin

Inventor:
John R. Burdick
By Chas. F. Page
Atty.

(No Model.) J. R. BURDICK. 3 Sheets—Sheet 2.
APPARATUS FOR MOLDING THE SECTIONS OF CONDUITS FOR UNDERGROUND CONDUCTORS.
No. 332,047. Patented Dec. 8, 1885.
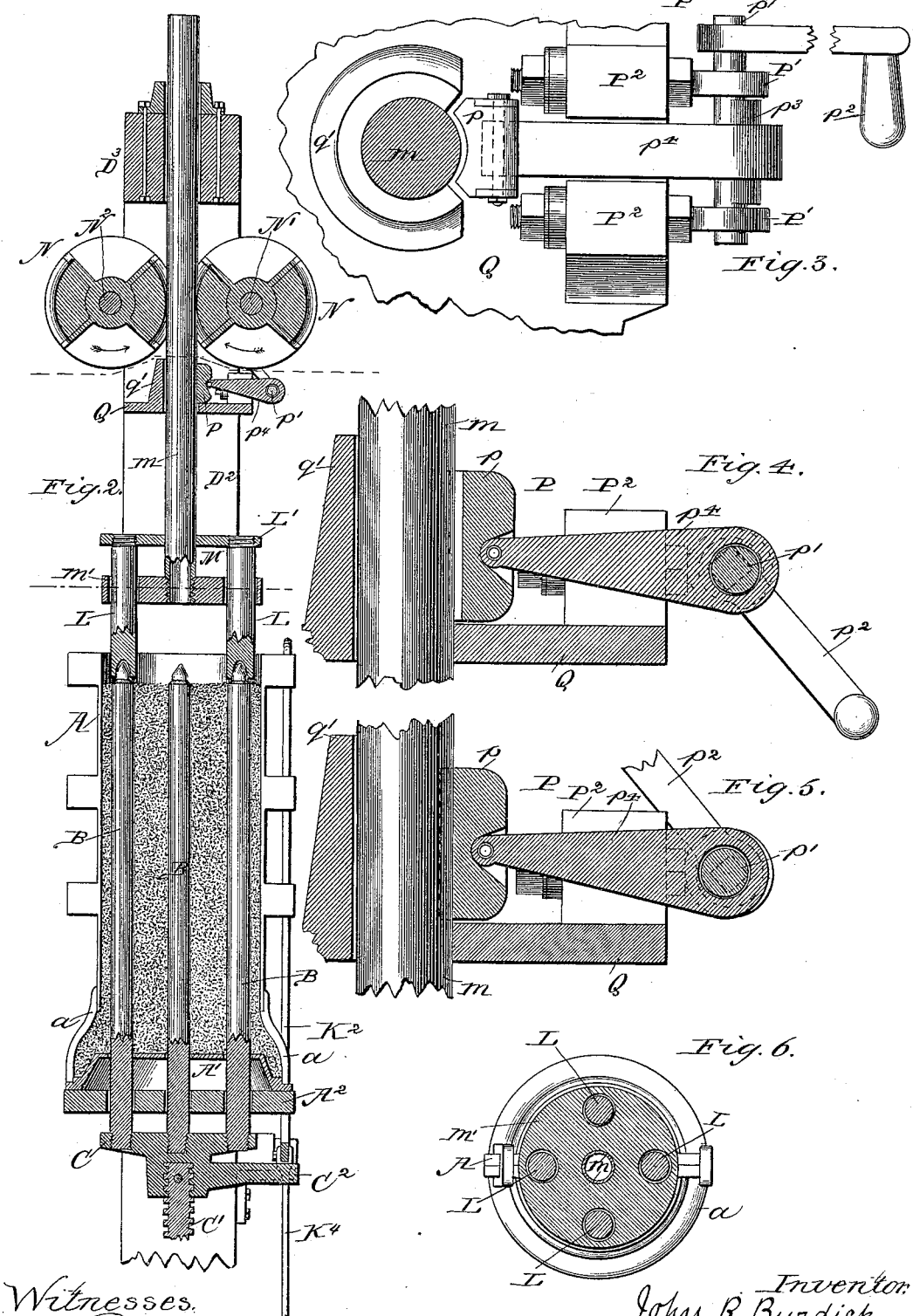
Witnesses
W. Rossiter
F. W. Servin
Inventor
John R. Burdick
By Chas G. Page
Atty.

(No Model.) 3 Sheets—Sheet 3.
J. R. BURDICK.
APPARATUS FOR MOLDING THE SECTIONS OF CONDUITS FOR UNDERGROUND CONDUCTORS.
No. 332,047. Patented Dec. 8, 1885.
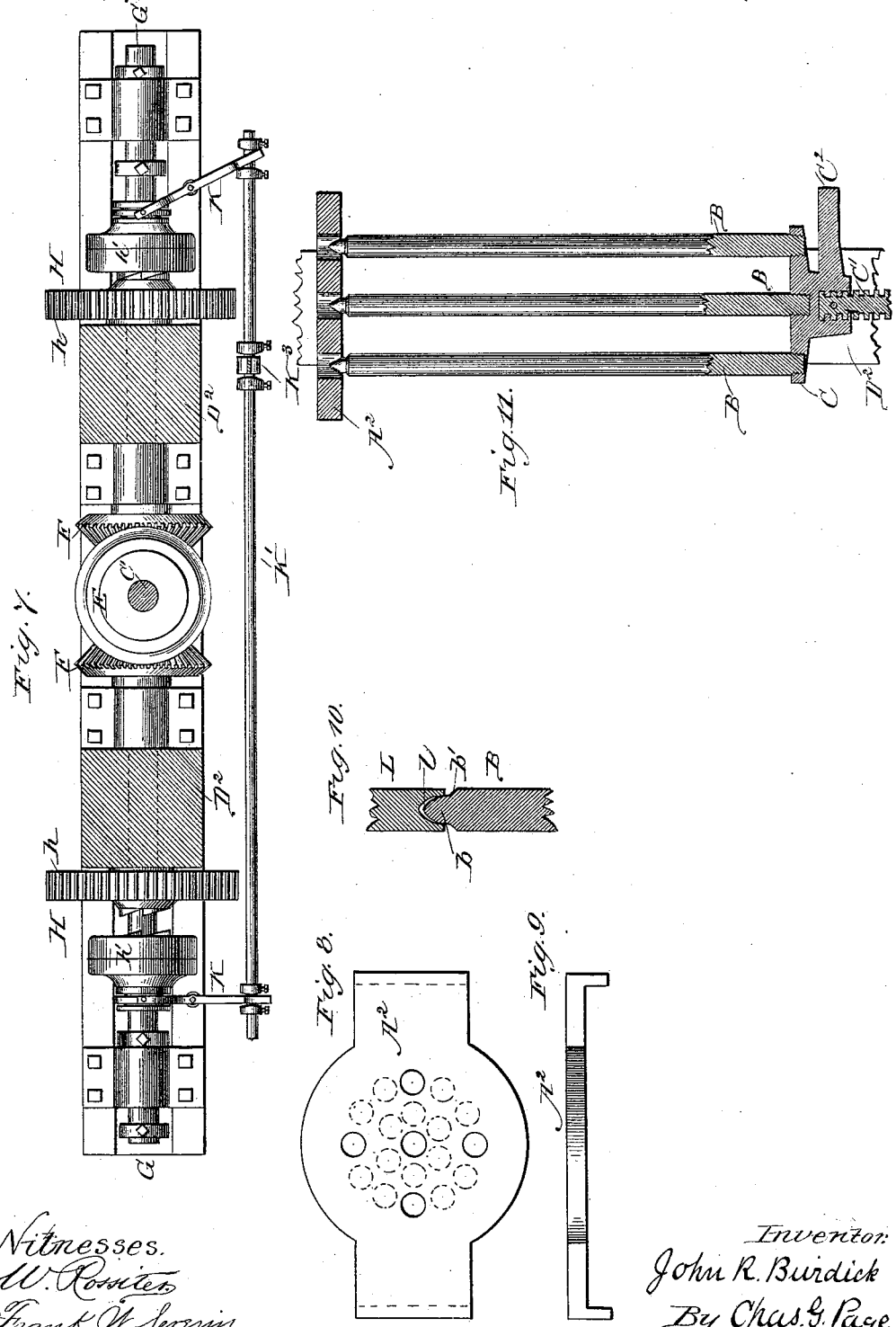
Witnesses.
W. Rossiter
Frank W. Servin
Inventor:
John R. Burdick
By Chas. G. Page
Atty.

UNITED STATES PATENT OFFICE.

JOHN R. BURDICK, OF CHICAGO, ILLINOIS, ASSIGNOR OF ONE-HALF TO DANIEL H. DORSETT, OF SAME PLACE.

APPARATUS FOR MOLDING THE SECTIONS OF CONDUITS FOR UNDERGROUND CONDUCTORS.

SPECIFICATION forming part of Letters Patent No. 332,047, dated December 8, 1885.

Application filed August 6, 1885. Serial No. 173,794. (No model.)

*To all whom it may concern:*

Be it known that I, JOHN R. BURDICK, a citizen of the United States, residing at Chicago, in the county of Cook and State of Illinois, have invented a certain new and useful Improvement in Apparatus for Molding the Sections of Conduits for Underground Conductors, of which the following is a specification.

This invention relates to improvements in apparatus or machines for forming conduit-sections more particularly adapted for underground-wire service, and of that class in which the sections are composed of some suitable insulating compound or material, which is molded to form through each section, from end to end thereof, a desirable number of straight bores, serving as ducts or passages for the conductors, the sections being usually made cylindric, with their ends adapted for coupling, in order that when laid underground, or elsewhere, they can be connected together, so as to provide a conduit having throughout a series of separate and distinct wire-receiving passages. The material which has been found best adapted for forming these conduit-sections has been filled into the mold while in a heated plastic condition, the cores for forming the ducts being introduced into the mold preparatory to the filling in of the plastic material or composition to be molded.

Patent No. 291,996 of the United States is selected as an illustration of a machine heretofore employed for forming conduit-sections for underground conductors of the aforesaid character, and as showing the way in which the core-rods for forming ducts through the conduit-sections have been introduced into and withdrawn from the mold. In said patented machine the core-rods are carried by a sliding head or carrier, which is arranged over the mold and brought down preparatory to filling in the material, so as to cause the core-rods to extend down through the mold and into and through a perforated base for the same, the core-rods being drawn upwardly and out of the mold, after the material has been filled therein, by raising the head or carrier from which they depend. In machines of such character for forming conduit-sections of the character aforesaid the plastic material, if compressed at all within the mold, has been compressed after the mold has been filled, to do which the degree of force employed to effect a compression of the entire mass would of necessity be so great as to seriously affect the constitution of the composition and impair its usefulness for the purpose for which it is intended. This defect will be especially noticeable where the compound contains sand and asphaltum as a base, although the same objection will be found incident to the use of other insulating compounds used in the manufacture of conduit-sections for underground conductors.

The object of the present invention is to provide a construction whereby the core-rods can be run up within and withdrawn from the mold from below, and the material conveniently introduced into the mold in successive lots, and each lot packed or tamped as soon as it has been thus introduced, thereby properly and uniformly compacting the entire mass and forming a conduit-section having the required density throughout. The core-rods are raised and lowered by a mechanism arranged below the mold, and the tamping head or device is operated by a mechanism arranged above the mold, in which way the presence in a conduit-section-molding machine of two separate mechanisms, respectively adapted for the aforesaid purposes, is rendered practicable and the operation of dumping the material into the mold facilitated, for the reason that when the core-rods extend up through the bottom of the mold and terminate at or near the top thereof the material can be dumped into the mold more readily than where a head provided with a set of depending core-rods is arranged over the mold, so as to permit the rods to extend down into the latter.

The sliding support for the core-rods is herein arranged below the mold, and is automatically stopped at either end of its desired extent of up or down stroke. The core-rods, when extended up within the mold, are steadied by devices which also serve as guides for the tamping-head. Means are provided whereby the tamping-head can be permitted to drop into the mold, and then alternately raised and dropped to tamp the material at any height within the same by a rapid succession of blows, and then run up to a proper elevation above the mold, where it is automatically stopped and held until such time as it is to be again dropped. Provision is also made whereby, when the tamping-head is run up, it may lift the devices employed for steadying the core-rods, so as to leave at a point directly over the mold a clear space for dumping a fresh lot of material into the latter, or for permitting the mold to be removed after the core-rods have been drawn down. When the core-rods are thus drawn down and out through the bottom of the mold, any tendency which they may have to draw upon the material will be exerted in the direction of the weight of the mass, whereby any tendency of the rods on passing out to loosen up the material will be avoided.

In the drawings, Figure 1 represents in side elevation a machine constructed in accordance with the principle of my invention, a portion of the mold being, for convenience of illustration, broken away to expose the connected ends of one of the core-rods and one of the upper rod-sections or steadying-rods, both of which are shown partially in section. In this view a rotary gear-nut and the lower end of a screw-stem belonging to the mechanism for raising and lowering the core-rods are also shown in section. Fig. 2 is a detail section on a vertical plane through a portion of the apparatus, parts of which are illustrated in elevation. This view is on a somewhat larger scale than the preceding figure. Fig. 3 is a detail representing a section on the line 3 3, Fig. 2, so as to show in plan a brake mechanism for the stem of the sliding tamping-head. Fig. 4 is a detail section on a vertical plane through the brake, said brake mechanism with the brake-shoe off from the stem of the tamping-head. Fig. 5 is a view similar to Fig. 4, but with the brake-shoe applied to the said stem. Fig. 6 is a transverse section through the tamping-head and upper rod-sections or steadying-rods on the line 6 6, Fig. 2. Fig. 7 is a sectional plan taken on line 7 7, Fig. 1, and showing the lower driving mechanism and lower clutch-shifting devices for operating and controlling the movements of the core-rods. Fig. 8 is a top plan view of the perforated base upon which the mold is to be placed. Fig. 9 is a side edge view of said perforated base. Fig. 10 is an enlarged sectional detail showing the meeting ends of one of the core-rods and one of the upper rod-sections. Fig. 11 is a detail section showing the perforated base with the core-rods drawn below the top of the same.

A indicates a two-part or separable mold, adapted to the form of conduit-section to be produced, its shape, when closed, being desirably a hollow cylinder, having one end made flaring or bell-mouthed, as at $a$. The mold when in position to receive the material stands upright, with its flaring end at the bottom, at which said end the mold is closed by an inverted-cup-shaped bottom, A', made separate from and removably fitted in any suitable way to close the lower expanded end of the mold. In this way the annular space left between the wall of the mold and the inverted-cup-shaped bottom serves as a means for forming the flange or collar, desirably provided at one end of each conduit-section. The bottom piece, A', is provided with a set of perforations corresponding in number and position to the number and position of the core-rods B, which are designed to enter and leave the mold through the apertures of the perforated mold-bottom.

When in position to receive the material, the mold stands in an upright position upon a base, $A^2$, provided with perforations corresponding with the perforations of the mold-bottom, and secured to the main frame of the machine—as, for example, to a pair of upright beams or standards, which serve as the sides of the frame. The core-rods, which can be made hollow or solid, but which are desirably solid, are arranged to slide through the perforated base and bottom aforesaid, and are secured at their lower ends to a vertically-sliding head or carrier, C. This movable head or carrier for the core-rods is arranged to reciprocate below the base-support for the mold, and is both steadied and guided in its movement by a pair of upright guide-rods, D, which at their upper ends are conveniently tied to the base $A^2$, and at their lower ends similarly, or otherwise, secured to any suitable fixture—for example, to a cross-bar, D', which combines with a pair of strong upright beams, $D^2$, to form a substantial frame-work designed to support at appropriate places bearings suitable for the several operative members of the machine.

As a means for running the core-rods up into the mold preparatory to filling in the material, the core-rod carrier C is provided with a pendent threaded stem, C', forming a screw-shaft rigid with the core-rod carrier. This screw-stem passes through and is raised and lowered by a rotary gear-nut, E, which may be operated alternately in opposite directions by one or the other of the two bevel-gears, F F, arranged to engage the nut, respectively, at opposite sides of the same. The nut is conveniently provided with a hollow journal, $e$, having a bearing on the cross-bar, D', and serving as a passage for the screw-stem, which latter works either up or down through the nut, according to which one of the gears is called into action. The independently-rotatable spindles G G, upon which the bevel-gears are separately secured, may be connected with or disconnected from the driving-power in any desired or convenient way, a preferred means for separately operating said spindles being to provide each spindle with a clutch, H, of which the loosely-running member $h$ is geared to a rotary shaft, I, provided with a pulley, I', for the driving-belt.

The sliding glands or members $h'$ are controlled by a clutch-shifting mechanism, which is placed under the control of an attendant standing near the mold, and which is also automatically operated to arrest the motion of the devices for raising and lowering the cores the instant the cores have attained either their highest or lowest desired position. To such end each shifting gland is individually operated by one of two clutch-levers, K K, which latter are connected with and operated by a shifting-rod, K', common to both levers. The connection between the shifting rod and the clutch-levers is such that the rod may be adjusted to a limited extent either way to throw both of the shifting-clutch members out of clutch, so as to stop the devices for raising and lowering the core-rods, or that it may be adjusted to a farther extent either way to throw one of said members out of clutch and to bring the remaining member into clutch, so as to start up the core raising and lowering devices, for the purpose of either raising or lowering the cores, according to which one of the clutches is thrown into action. The shifting-rod K' is connected with and controlled from a double-armed lever, K², through the medium of a bell-crank, K³, and an extensible connecting-rod, K⁴. The bell-crank is pivoted to one of the standards, with an end of one of its arms forked to straddle the shifting-rod at a point between a pair of shoulders upon the latter, and the connecting-rod is pivoted at its lower end to the remaining arm of the bell-crank, and at its upper end pivotally attached to one of the arms of the lever K³. This double-armed lever is likewise conveniently pivoted to one of the standards, and is arranged with one of its arms extending above the floor, or within convenient reach of an attendant, who can thus stop or start this portion of the machine at will. To provide for automatically arresting the same at proper moments, the lower arm of the hand-lever K² and the upper arm of the bell-crank K³ are arranged to lie alongside the screw-stem of the core-carrier, and to stand in the path of a stud or stop, C², which projects from the stem at or near its upper end. The location of this stop and the normal position of said arms are so timed with reference to the required extent of stroke in either direction of the core-carrier that the instant said core-carrier has reached a predetermined limit of motion, either up or down, the action of the stop against one or the other of the levers will operate the clutch-shifting mechanism to an extent sufficient to throw both sliding clutch members out of clutch, and thereby immediately arrest the operation of the core raising and lowering device. The connecting-rod K⁴ is made extensible or adjustable in length in any of the ways common to connecting-rods, so that the connected arms of the levers can be adjusted toward or away from each other with reference to the moment at which it is found necessary for the stops upon the stem to strike and operate either lever.

The means devised for holding and steadying the core-rods at their upper ends, when they are extended up through the mold, and while the material is being filled into and packed within the latter, consist of a series of rods, L, which depend from a head or carrier, L', arranged to be raised and lowered at a point over the mold, when the latter is in position to receive the core-rods. The rods L correspond in number and position to the core-rods, and are at all times kept in accurate alignment therewith, for which said purpose the head or carrier L' is rigidly appended to a pair of upright slide-rods, L², arranged to work through appropriate guides in or upon the main frame. The rods L are intended to connect with the upper ends of the core-rods, when the latter are in their highest or proximately highest position, for which purpose the lower ends of the core-steadying rods are recessed to receive the upper ends of the core-rods, which are somewhat tapered, as best illustrated in Fig. 10, wherein the tapered and somewhat rounded top end, b, of one of the core-rods is shown received to some extent within a correspondingly-shaped socket, l, formed in the lower end of one of the steadying-rods. It will be noticed that while the lower end of the steadying-rod at a point around its recess is squared, the shoulder b' around the base of the tapered end portion, b, of the core-rod is beveled, so as to incline downwardly therefrom. This construction is provided to permit the free escape of any of the material which in filling the mold may have been left upon the upper ends of the core-rods, and which during the act of closing the ends of the upper rods upon the core-rods will be stripped off by the descending rods.

When the rods B and L are connected together, as in Fig. 2, the upper rods, L, constitute, in effect, temporary upper sections or extensions of the cores, which may be said to practically consist of divided rods, with their lower sections carried by a head arranged to reciprocate below the mold, and their upper and lower sections carried by a head arranged to rise and fall above the mold, in which way the upper and lower sections can be temporarily united while the material is being filled into the mold, and then separated, so as to permit the mold to be freed from their presence and left ready for removal.

The movable head carrying the steadying-rods or upper rod-section, L, can be simply raised and lowered by hand, or lowered by hand and raised by a tamping device, hereinafter described, for which purpose it is counterbalanced by means of weighted cords L³, attached to the top ends of the slide-rods L², and trained over pulleys L⁴, appropriately arranged overhead, the weights for said cords being herein indicated at L⁵.

The composition for forming the conduit-sections for underground conductors is desirably introduced into the mold while in a heated plastic condition, and while in such condition is susceptible of being compacted before it cools, so as to produce an article having the required density, durability, and other qualities desirable in an underground conduit. To such end the said composition or material is introduced in successive lots, and each lot packed down or tamped as soon as it has been placed within the mold.

The packing or tamping device M, herein provided for packing or tamping the material within the mold, consists of a reciprocating plunger constructed with a vertically-arranged sliding stem, $m$, provided at its lower end with a head, $m'$, desirably formed by a block or plate, which is perforated in correspondence with the number, size, and position of the core-rods, in order that it may enter the mold at a time after the core-rods have been run up within the same. This tamping device is operated by a mechanism adapted to permit it to drop into the mold, and to then alternately lift and release it, so as to compact the material by means of a rapid succession of uniform blows, after which the tamping device can be run up out of the mold and automatically stopped at a proper height above the same. On its way up, the tamping-head $m'$, after leaving the mold and the core-rods, slides upon the upper rods, L, until it strikes the upper rod-carrier, L', at which juncture it lifts the said carrier, so as to draw the rods L up and away from the core-rods. The rods L, under such arrangement, subserve the additional function of guides for directing the tamping-head of the tamping device to and upon the core-rods proper, and for maintaining the apertures of the tamping-head in coincidence with the core rods at such times as the tamping-head may have been drawn up out of the way.

The tamping device is operated by a pair of rotary cams or segment-wheels, N, arranged at opposite sides of the stem, respectively, and provided with grooved faces, which during their rotation engage and release the stem in rapid succession, so as to alternately lift and permit the stem to drop, and thus cause a rapid and effective tamping action on the part of the tamping-head. The lift will always be to a uniform extent, in which way the force of impact upon the material within the mold will at all times be the same, irrespective of the height of the material, and hence a uniformity in density will be preserved through the entire mass within the mold.

A device for engaging the stem of the tamping-head in such a way that the same can be held against dropping during the intervals in which it is released by the rotary cams or segment-wheels, but permitted to be raised by each engagement of the rotary cams or segment-wheels therewith, consists of a brake, P, arranged to be applied at will to the stem in a manner whereby the tendency of the stem to drop will cause the brake shoe to take a bite or hold thereon, while an upward pull upon the stem will loosen the hold of the brake-shoe, so as to allow the stem to be drawn up. To such end the brake comprises a shoe, $p$, disposed so as to be thrown against or withdrawn from the tamping-stem, and arranged to slide upon a plate, Q, which is attached to the main frame.

The brake-shoe is operated by means of a rock-shaft, $p'$, carrying a suitable handle, $p^2$, within reach of an attendant, and further provided with an eccentric, $p^3$, which is connected with the shoe by a strap or link, $p^4$. This link is pivoted to the shoe at a point above the level of the axis of the rock-shaft $p'$, in which way, when the shoe is against the stem, a tendency on the part of the latter to rise will also tend to lift the shoe and link, which latter, in its upward swing, will draw the shoe in a direction away from the stem; while, on the contrary, a tendency on the part of the stem to drop will cause an opposite action on the part of the shoe and link, and thus cause the shoe to bite or bind against the stem to an extent sufficient to prevent a drop of the stem. It will also be observed that by pivotally connecting the link to the shoe the bearing-face of the latter will, when the shoe and link are raised, maintain a proper parallelism with the stem, so that during the upward lifts of the stem it will work freely and smoothly.

The bearings P' for the rock-shaft of the brake mechanism are adjustably supported upon a horizontally-arranged frame or plate, Q, which latter is secured between the standards of the main frame, and provided with guide-passages suitable for both the stem $m$ of the tamping device and the stems or slide-rods $L^2$ of the head or carrier for the upper rod-sections. The said plate is desirably provided with hollow bosses $q$ at the points where it is apertured for the passage of the sliding rods $L^2$, so as to effectively guide and steady the same; but at the point where it is apertured for the passage of the tamping device stem a half-cylindrical boss, $q'$, Fig. 2, is desirably formed, to stand against the stem, in opposition to any pressure of the brake-shoe against the latter, in which way, when the brake is applied, the said half-boss constitutes a bearing at one side of the stem, in opposition to the brake-pressure against the opposite side of the same, so as to cause the stem to work true.

The bearings P' for the rock-shaft of the brake device are adjustable in a direction parallel with the line of force or action of the brake-shoe, for which purpose they may consist of eyebolts adjustably secured in blocks $P^2$, arranged upon the frame or plate Q.

The rotary cam or segment wheels may be driven from power overhead, but are herein shown as conveniently operated from the low-down driving-shaft I, for which purpose this shaft is connected by a link-belt, R, with an upper horizontally-arranged shaft, N', upon which latter one of the cam or segment wheels is secured. Each shaft is provided with a sprocket appropriate for the link-belt, and the upper shaft is provided with a suitable clutch, R, which is actuated by a lever, R', arranged within reach of an attendant. This clutch-lever extends over the carrier L' for the upper rod-sections, in which way, when said carrier has been raised by the ascending tamping device to the proper height, the carrier will strike against and actuate the clutch-lever, which will in turn operate the clutch, so as to disconnect shaft N' from the driving-power, and thereby automatically arrest the cams or segment-wheels, one of which is mounted upon said shaft N', and the other similarly applied upon a rotary shaft, N², which latter will be geared with and driven from the shaft N' in any desired way.

At the top of the main frame is a cross-bar, D³, provided with guides appropriate for the several sliding stems or rods L² and $m$ it being observed that while the construction of main frame herein shown may be considerably modified, that shown is simple and convenient, and serves as a substantial support for the bearings necessary for the several operative members of the machine. Preferably the standards of the main frame of the machine are arranged to extend up through the floor of a building, so as to bring the perforated base for the mold about on a level with the floor, so that an attendant standing thereon may conveniently control the machine and attend to the mold.

In Fig. 1 the floor is indicated by a dotted line, as will be readily understood without further illustration or description. In operating this machine the mold is placed upon the perforated base, the mechanism for raising and lowering the core-rods started up, and the core-rods run up into the mold to the proper height, at which juncture the mechanism by which they are raised will be automatically arrested. A suitable quantity of the material is then dumped into the mold in some suitable way, preferably by placing on the mold a tray having a sliding bottom, which can be removed so as to let the material contained therein drop into the mold. The steadying-rods L are then moved down to connect with the core-rods, and the tamping device let down by releasing the brake from the stem thereof, which, being released, will drop, and in case the cams or segment-wheels are in engagement therewith will pull them around sufficiently to effect its release therefrom. Power is then applied to drive the cams or segment-wheels, so as to cause the tamping-head to strike the material within the mold with a few rapid uniform blows, after which, by applying the brake, the tamping device, and consequently the rods L, can be raised until automatically arrested, as hereinbefore stated.

The foregoing operation can be repeated as many times as may be necessary to fill the mold, after which the mold can be taken off to cool and another mold substituted in its place.

What I claim as my invention is—

1. In an apparatus for forming conduit-sections for underground conductors, the combination, with the mold provided with a perforated bottom, of the core-rods arranged to enter and leave the mold from below, and means for raising and lowering the core-rods to an extent whereby they can be run up into the mold or drawn down and out from the same, substantially as described.

2. The combination, with the mold provided with a perforated bottom, of a reciprocating carrier provided with a set of upright core-rods arranged to enter and leave the mold through its perforated bottom, and a screw and nut, substantially as described, for raising and lowering the core-rod carrier.

3. The combination, with the mold provided with a perforated bottom, of the reciprocating core-rod carrier provided with a set of upright core-rods arranged to enter and leave the mold through its perforated bottom, a threaded stem appended to the carrier, a rotary gear-nut applied to raise and lower the threaded stem, and a system of gearing and clutch devices, such as described, for operating the nut in opposite directions and arresting the motion thereof when the core-rod carrier has reached the proper extent of its stroke in either direction, substantially as described.

4. The combination, with the mold, of the reciprocating core-rod carrier provided with a series of core-rods arranged to enter and leave the mold, a mechanism for reciprocating the core-rod carrier, and an automatic stop mechanism for automatically arresting the motion of the core-rod carrier at the desired extent of stroke in either direction, substantially as described.

5. The combination, with the mold, of the reciprocating core-rod carrier provided with a set of core-rods arranged to enter and leave the mold, a mechanism for reciprocating the core-rod carrier, clutch devices for controlling said reciprocating mechanism, a stop projection carried with the core-rod carrier, and a pair of connecting-levers applied to control the clutch devices and standing in the path of the stop projection of the core-rod carrier, respectively at one and the other of the two points proper for the limitation of the up-and-down stroke of the core-rod carrier and core-rods, substantially as described.

6. The combination, with the mold provided with a perforated bottom, of the core-rods supported upon a reciprocating carrier which is operative below the mold, a tamping device for tamping the material within the mold, and means for operating the tamping device, substantially as described.

7. The combination, with the mold, of the reciprocating core-rods arranged to enter and leave the mold from below, a tamping device, means suitable for operating the tamping device to tamp the material at any height within the mold, and means suitable for raising and holding the tamping device above the mold when not in use, substantially as described.

8. The combination, with the mold and the reciprocating core-rods arranged to enter and leave the mold from below, of a set of upper rod-sections arranged to descend and connect with the upper ends of the core-rods when the latter are extended up through the mold, and to be raised from their connection with the core-rods at will, substantially as and for the purpose described.

9. The combination, with the mold and the reciprocating core-rods arranged to enter and leave the mold from below, of the sliding carrier provided with a set of depending rods adapted to be connected with and disconnected from the upper ends of the core-rods, substantially as described.

10. The combination, with the mold and the reciprocating core-rods, of the tamping device constructed with a perforated head having an upright sliding stem, and a pair of rotary cams or segment-wheels applied to alternately engage and release the stem of the tamping-head, substantially as described.

11. The combination, with the mold and the reciprocating core-rods, of the tamping device, the rotary cams or segment-wheels for alternately engaging and releasing the same, and a brake arranged to be applied to check the drop, but to permit the ascent of the tamping device, substantially as described.

12. The combination, with the mold, of the tamping device, the rotary cams or segment-wheels for operating the same, and a brake, P, having its shoe pivotally connected with a swinging link-lever, substantially as and for the purpose described.

13. The combination, with the mold and the reciprocating core-rods arranged to enter and leave the mold from below, of an upper sliding carrier provided with a set of pendent rods, L, to connect with and steady the core-rods when the latter are extended up within the mold, a perforated tamping-head fitted to slide upon said connected rods, means for operating the tamping-head, and means for raising it out from the mold, substantially as described.

14. The combination, with the mold, of the reciprocating core-rods, the upper sliding carrier provided with a set of pendent rods, L, the tamping device, mechanism suitable for raising the tamping device above the mold, and a clutch device adapted for controlling said mechanism, and provided with a lever normally standing over and in the path of the carrier for the rods L, substantially as and for the purpose described.

15. The combination, with the main frame, of a perforated base, $A^2$, for the mold, the reciprocating core-rod carrier arranged to operate below said base and provided with a set of upright core-rods, and means, substantially as described, for reciprocating the core-rod carrier, for the purpose set forth.

16. The combination, with the mold, of the reciprocating core-rods arranged to enter and leave the mold from below, the vertically-operating tamping device, and means, substantially as described, for operating the same, and the sliding carrier provided with one or more depending rods, L, and suspended by means whereby it is counterbalanced, for the purpose set forth.

JOHN R. BURDICK.

Witnesses:
CHAS. G. PAGE,
FRANK W. SEVERIN.